United States Patent Office 2,833,776
Patented May 6, 1958

2,833,776
ARYL-SUBSTITUTED PIPERIDYLPROPANOLS

Arlo Wayne Ruddy, Morris Plains, N. J., assignor to Warner-Lambert Pharmaceutical Company, New York, N. Y., a corporation of Delaware No Drawing. Application September 6, 1955
Serial No. 532,772

6 Claims. (Cl. 260—294.7)

This invention relates to new compounds of pharmaceutical value, particularly as antispasmodics.

In accordance with my invention there are provided compounds having the general structural formula:

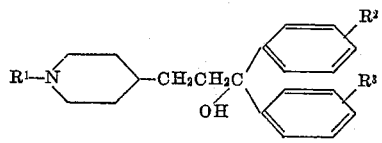

wherein $R^1$ denotes lower alkyl; and $R^2$ and $R^3$, which may be the same or different, denote hydrogen, halogen, hydroxyl, methoxyl or methyl. These compounds have been found to possess highly effective antispasmodic activity.

The compounds of my invention may be prepared in accordance with the following scheme:

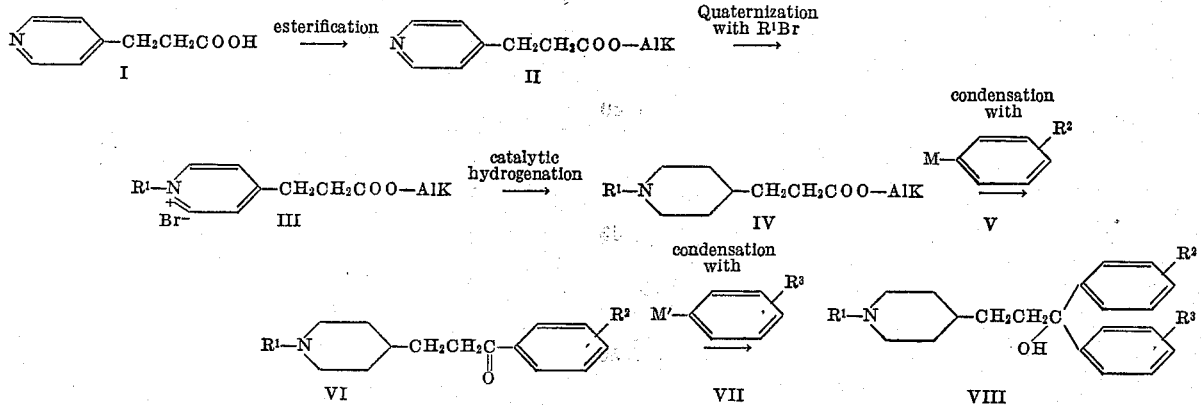

wherein $R^1$, $R^2$ and $R^3$ are as defined above, AlK denotes lower alkyl, and M and M' denote lithium or the monovalent radical —MgBr. In cases where R' specifically denotes methyl, the compounds of Formula IV may be obtained from the compounds of Formula II directly by catalytic hydrogenation in the presence of formaldehyde, as well as by the route represented in the above scheme. In cases where $R^2$ and $R^3$ are the same, the compounds of Formula VIII may be obtained from the compounds of Formula IV directly by condensation with an excess of the organometallic compounds V. On the other hand if $R^2$ and $R^3$ are different, a limited amount of the organometallic compound is condensed with the compounds of Formula IV to furnish the intermediate ketones of Formula VI which are then converted to the corresponding carbinols of Formula VIII as indicated in the above scheme.

The organometallic compounds V and VII may be readily obtained from the corresponding halobenzenes in accordance with prior art procedures. Thus phenylmagnesium bromide and phenyllithium may be obtained directly from bromobenzene; p-methoxyphenylmagnesium bromide and p-methoxyphenyllithium are derived from p-bromoanisole; p-chlorophenyllithium and p-bromophenyllithium are obtained by condensation of ethyllithium with p-bromochlorobenzene and p-dibromobenzene respectively [see Izvestiya Akademii Nauk SSSR, Otdeleni Khimicheskikh Nauk 126–134 (1953); C. A. 48, 3285 (1954)].

In cases where the phenyl substituent $R^2$ or $R^3$ of Formula VIII is required to be the hydroxyl radical, the preferred preparative procedure comprises temporarily protecting the phenolic function of the precursors of compounds V and VII prior to preparation of the corresponding organometallic compound. Such temporary protection may be obtained for example by condensing the appropriate halophenol with benzyl chloride followed by reaction of the resulting benzylhalophenyl ether with magnesium or lithium. After the resulting organometallic intermediate is condensed with the appropriate piperidylpropionic ester or piperidylpropiophenone derivative, the substituted diphenylcarbinol ultimately obtained is hydrogenated in the presence of a palladium catalyst in order to remove the protective benzyl group, thereby regenerating the free phenolic hydroxyl function and yielding the desired compound VIII.

The free bases of my invention are water-insoluble substances. Water-soluble salts may be formed by treating the free bases with acids such as hydrochloric acid, hydrobromic acid, sulfuric acid, tartaric acid, citric acid or succinic acid, or with suitable organic halides, e. g., alkyl halides such as methyl chloride or methyl bromide or other organic halides such as thienylmethyl chloride.

Among the compounds which may be prepared in accordance with this invention are the following:

3-(N-ethyl-4-piperidyl)-1,1-diphenyl-1-propanol
3-(N-methyl-4-piperidyl)-1,1-diphenyl-1-propanol
3-(N-methyl-4-piperidyl)-1,p-anisyl-1-phenyl-1-propanol
3-(N-methyl-4-piperidyl)-1,1-di(p-anisyl)-1-propanol
3 - (N - methyl - 4 - piperidyl) - 1 - (p-chlorophenyl)-1 - phenyl - 1 - propanol
3 - (N - methyl - 4 - piperidyl) - 1,1 - di(p - chlorophenyl)-1-propanol
3 - (N - methyl - 4 - piperidyl) - 1 - p - hydroxyphenyl-1-phenyl-1-propanol
3 - (N - methyl - 4 - piperidyl) - 1,1 - di(p - hydroxyphenyl)-1-propanol
3-(N-methyl-4-piperidyl)-1,1-di(p-tolyl)-1-propanol
3-(N-methyl-4-piperidyl)-1-phenyl-1-(p-tolyl)-1-propanol
3-(N-ethyl-4-piperidyl)-1,1-di(o-tolyl)-1-propanol as well as acid addition salts thereof and quaternary salts thereof.

*Example 1.—Ethyl β-(4-pyridyl)-propionate*

To a suspension of 119 g. of β-(4-pyridyl)-propionic acid (W. F. Doering and R. A. N. Weil, J. Am. Chem. Soc. 69, 2465 (1947)), in 350 ml. of absolute ethanol was added 117 ml. of conc. sulfuric acid. The reaction mixture was refluxed for seven hours. The cooled solution was poured on to about 1 kg. of cracked ice and then made alkaline to pH 9 with conc. ammonium hydroxide. The liberated ester was thoroughly extracted with ether, and the combined extracts were dried over anhydrous sodium carbonate. The solvent was removed and the residue distilled under reduced pressure to give a 73% yield of ester; B. P. 115–129°/0.3 mm., $n_D^{25}$ 1.4953.

*Example 2.—Ethyl β-(N-methyl-4-piperidyl)-propionate*

This ester can be prepared by either of the two following procedures:

*Procedure A.*—A solution of 35.8 g. (0.2 mole) of ethyl β-(4-pyridyl)-propionate in absolute ethanol-glacial acetic acid (1:1) was reduced at 45 lbs. of hydrogen and room temperature using platinum oxide catalyst. About 50 hours were required to completely saturate the pyridine ring. To the mixture containing the 4-piperidyl ester was added 17 ml. of 37% aqueous formaldehyde and the hydrogenation continued. The N-methylation was complete in about 90 minutes at 45 lbs. of hydrogen and room temperature. The catalyst was filtered out and the filtrate made acid to pH 3 with conc. hydrochloric acid. The solution was evaporated to a heavy syrup under reduced pressure and the base was liberated using 50 g. of potassium carbonate and 5 cc. of water. The base was extracted with chloroform by decantation and the extract dried over anhydrous potassium carbonate. The solvent was removed and the residue was fractionated under reduced pressure. An 85% yield (34.6 g.) of ethyl β-(N-methyl-4-piperidyl)-propionate was obtained; B. P. 119–122°/10 mm., 1.4530.

*Procedure B.*—A solution of 35.8 g. (0.2 mole) of ethyl β-(4-pyridyl)-propionate in 40 ml. of methanol was heated to 50° C. and methyl bromide passed in until the quaternization was complete and the solution no longer basic. The reaction was refluxed to remove the excess methyl bromide and then the methanol removed on a steam bath under reduced pressure. Ether was added and the residue was induced to crystallize. The quaternary salt was filtered, washed with ether and dried. A practically quantitative yield of product was obtained; M. P. 99–100° C. The methobromide was then dissolved in 350 ml. absolute ethanol and reduced at 45 lbs. of hydrogen and 50° C. with platinum oxide catalyst. The reduction was complete in 2 to 3 hours. The catalyst was removed and the solvent distilled in vacuum. The residue was made strongly basic with 50% sodium hydroxide, extracted with ether, and the extracts dried over anhydrous potassium carbonate. The solvent was removed and the product fractionated under reduced pressure. An 81% yield of ethyl β-(N-methyl-4-piperidyl)-propionate was obtained; B. P. 80–81°/1.2 mm., $n_D^{25}$ 1.4547.

*Example 3.—3-(N-methyl-4-piperidyl)-1,1-diphenyl-1-propanol*

This compound can be prepared by either of the two following procedures:

*Procedure A.*—A solution of phenylmagnesium bromide was prepared in the usual manner from 10.5 g. (0.435 mole) magnesium turnings and 68.3 g. (0.435 mole) bromobenzene in 250 ml. dry ether. The solution was then cooled in an ice bath and a solution of 34.6 g. (0.17 mole) of ethyl β-(N-methyl-4-piperidyl)-propionate in 200 ml. dry benzene was added slowly with stirring. The mixture was allowed to warm up slowly and then was refluxed for two hours. The reaction was hydrolyzed by pouring into ammonium chloride solution. The organic layer was separated, washed with water then 5% sodium hydroxide solution, and again with water. After drying over anhydrous potassium carbonate the ether and benzene were removed under reduced pressure. The residue was induced to crystallize by stirring with Skellysolve C. There was obtained 7.4 g. of 3-(N-methyl-4-piperidyl)-1,1-diphenyl-1-propanol base; M. P. 145–146° C. By distilling the mother liquor 17.6 g. of ω-(N-methyl-4-piperidyl)-propionphenone, B. P. 175–190°/10 mm., $n_D^{25}$ 1.5351, was recovered. This ketone was formed by the addition of only one mole of phenylmagnesium bromide to the ester. The ketone is readily converted to the desired product by the addition of one mole of phenyl lithium in the usual manner.

*Procedure B.*—A solution of phenyl lithium was prepared by adding 343 g. (2.8 moles) of bromobenzene in 750 ml. of dry ether to a stirred suspension of 30.3 g. (4.37 moles) of lithium ribbon in 1250 ml. of dry ether. After the reaction was complete it was chilled to about 0° C., and 145 g. (0.728 mole) of ethyl β-(N-methyl-4-piperidyl)-propionate in 1 liter of dry benzene was added with stirring. During the addition the temperature was held at about 5° C. or below. The reaction mixture was then gradually warmed and finally refluxed for six hours. It was hydrolyzed by pouring into a cold solution of ammonium chloride and then extracted with chloroform. The combined extracts were dried over anhydrous potassium carbonate and the solvent was removed under reduced pressure. The residue was recrystallized from absolute ethanol and 157 g. (69.6%) of the desired 3-(N-methyl-4-piperidyl)-1,1-diphenyl-1-propanol base, M. P. 146–147° C., was obtained.

*Example 4.—3-(N-methyl-4-piperidyl)-1,1-diphenyl-1-propanol hydrochloride*

The base described in the preceding example was dissolved in anhydrous ether and precipitated with hydrogen chloride. The salt when recrystallized from ethanol was a colorless, crystalline solid melting at 207.5–208.5° C.

*Example 5.—3-(N-methyl-4-piperidyl)-1,1-diphenyl-1-propanol methobromide*

The base described in Example 3 was dissolved in methanol and quaternized by passing in methyl bromide until the reaction was no longer basic. The excess methyl bromide and methanol were removed under reduced pressure and the product was purified by recrystallization from methanol and ether. The 3-(N-methyl-4-piperidyl)-1,1-diphenyl-1-propanol methobromide was a colorless, crystalline solid melting at 276–277° C. with decomposition.

*Example 6.—Ethyl β-(N-ethyl-4-piperidyl)-propionate*

When 49 g. of ethyl β-(4-pyridyl)-propionate ethobromide was reduced and purified, under the conditions described in Example 2B, the desired ester was obtained in 77% yield, B. P. 92–94° C./1.4 mm., $n_D^{25}$ 1.4606. The hydrobromide salt of the ester melted at 118–119° C.

*Example 7.—3-(N-ethyl-4-piperidyl)-1,1-diphenyl-1-propanol hydrochloride*

To an ether solution of phenyl lithium, prepared from 50.4 g. of bromobenzene and 4.46 g. of lithium ribbon, was added 22.9 g. (0.017 mole) of ethyl β-(N-ethyl-4-piperidyl)-propionate. The conditions of the reaction and the work up were those described in Example 3B. The 3-(N-ethyl-4-piperidyl)-1,1-diphenyl-1-propanol base when recrystallized from Skellysolve B melted at 101–103° C. The corresponding hydrochloride when recrystallized from ethanol and ether melted at 199–201° C.

*Example 8.—3-(N-ethyl-4-piperidyl)-1,1-diphenyl-1-propanol methobromide*

*Procedure A.*—When the base from Example 7 was quaternized with methyl bromide in methanol the corresponding methobromide was produced, M. P. 262–264° C., with decomposition.

*Procedure B.*—When the 3-(N-methyl-4-piperidyl)-1,1-diphenyl-1-propanol base from Example 3 was quaternized with ethyl bromide by refluxing in methanol the identical compound was produced as described in Example 8A, M. P. 263–264°, with decomposition.

Other compounds coming within the scope of this invention may be manufactured by following the procedures set forth above, using equivalent amounts of appropriate reactants. For example, the di-(p-chlorophenyl) analog of the product of Example 3 may be prepared by employing equivalent amounts of p-chlorophenylmagnesium bromide or p-chlorophenyl lithium in place of the phenylmagnesium bromide or phenyl lithium employed in procedures A and B of Example 3.

I claim:
1. A compound selected from the group consisting of compounds having the formula:

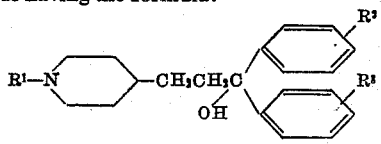

wherein $R^1$ is lower alkyl; $R^2$ is selected from the group consisting of hydrogen, halogen, hydroxyl, methoxyl, methyl; $R^3$ is selected from the group consisting of hydrogen, halogen, hydroxyl, methoxyl, methyl; and salts thereof.
2. 3-(N-methyl-4-piperidyl)-1,1-diphenyl-1-propanol.
3. 3-(N-methyl-4-piperidyl) - 1,1 - diphenyl-1-propanol hydrochloride.
4. 3-(N-methyl-4-piperidyl) - 1,1 - diphenyl-1-propanol methobromide.
5. 3-(N-methyl-4-piperidyl) - 1,1 - di(p - anisyl)-1-propanol.
6. 3-(N-methyl-4-piperidyl) - 1 - (p - chlorophenyl)-1-phenyl-1-propanol.

References Cited in the file of this patent
UNITED STATES PATENTS

| | | |
|---|---|---|
| 2,682,543 | Adamson | June 29, 1954 |
| 2,739,968 | Sperber | Mar. 27, 1956 |

FOREIGN PATENTS

| | | |
|---|---|---|
| 503,775 | Belgium | June 30, 1951 |
| 507,597 | Belgium | Dec. 31, 1951 |